United States Patent
Chuang

(10) Patent No.: US 6,707,666 B1
(45) Date of Patent: Mar. 16, 2004

(54) ELECTRONIC APPARATUS HAVING A TWO-PART MAIN BOARD MODULE CAPABLE OF SUPPORTING A DISPLAY MODULE AT DIFFERENT HEIGHTS

(75) Inventor: Wei-Pin Chuang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 10/364,375

(22) Filed: Feb. 12, 2003

(30) Foreign Application Priority Data

Nov. 22, 2002 (TW) ..................................... 91218914 U

(51) Int. Cl.[7] ................................................ H05K 5/02
(52) U.S. Cl. ......................... 361/681; 248/921; 16/342
(58) Field of Search ................................ 361/681–687, 361/724–727; 384/794; 248/917–924, 157, 161, 420; 16/342; 349/58

(56) References Cited

U.S. PATENT DOCUMENTS 5,719,799 A * 2/1998 Isashi ........................ 708/105
6,392,871 B1 * 5/2002 Yanase ....................... 361/681
6,430,038 B1 * 8/2002 Helot et al. ................. 361/681
2003/0142474 A1 * 7/2003 Karidis et al. .............. 361/683

* cited by examiner

Primary Examiner—Hung Van Duong
(74) Attorney, Agent, or Firm—Bacon & Thomas, PLLC

(57) ABSTRACT

An electronic apparatus includes a main board module with pivotally interconnected first and second module members, and a display module connected pivotally to the second module member. A biasing member is connected to the first and second module members, and biases the second module member from a first supporting position, where the first and second module members are capable of contacting a table surface, to a second supporting position, where the second module member is lifted away from the table surface. A releasable retaining device is provided on the main board module for retaining releasably the second module member at the first supporting position against biasing action of the biasing member.

10 Claims, 5 Drawing Sheets

ELECTRONIC APPARATUS HAVING A TWO-PART MAIN BOARD MODULE CAPABLE OF SUPPORTING A DISPLAY MODULE AT DIFFERENT HEIGHTS

CROSS-REFERENCE TO RELATED APPLICATION

This application claims priority of Taiwanese application no. 091218914, filed on Nov. 22, 2002.

BACKGROUND OF THE INVENTION

1. Field of the Invention

The invention relates to an electronic apparatus, more particularly to an electronic apparatus having a two-part main board module that is capable of supporting a display module at different heights.

2. Description of the Related Art

As the functionality of notebook computers grows stronger, in view of easy mobility and portability, an increasing number of consumers choose notebook computers over desktop computers. However, since the display unit of a notebook computer is relatively small, and since the viewing height for the screen of the display unit is relatively low, the user is forced to bow his head when using the notebook computer. For long time use, the posture of the user when using the conventional notebook computer is both ineffective and unhealthy.

On the other hand, when using a notebook computer to make a presentation before an audience, since the display unit is positioned at a relatively low height, the audience and the presenter must be crowded in a rather small area to view the notebook computer, which is not practical and convenient when making presentations.

SUMMARY OF THE INVENTION

Therefore, the object of the present invention is to provide an electronic apparatus having a two-part main board module that is capable of supporting a display module at different heights in order to overcome the aforesaid drawbacks associated with the prior art.

Accordingly, an electronic apparatus of the present invention comprises:

a main board module including a first module member, and a second module member connected to the first module member such that the second module member is pivotable relative to the first module member about a first pivot axis, each of the first and second module members having front and rear sides;

a display module having a viewing side, and connected to the second module member such that the display module is pivotable relative to the second module member about a second pivot axis parallel to the first pivot axis between a first viewing position, where the viewing side of the display module forms an angle with the front side of the second module member, and a second viewing position, where the viewing side of the display module is generally parallel to the front side of the second module member;

a biasing member having opposite ends connected respectively to the first and second module members, the biasing member biasing the second module member to pivot about the first pivot axis from a first supporting position, where the rear sides of the first and second module members are generally coplanar so as to be adapted to support the main board module on a table surface and where the display module is at a first height relative to the table surface when the display module is at the first viewing position, to a second supporting position, where the front side of the second module member forms an angle with the front side of the first module member and where the display module is at a second height relative to the table surface when the display module is at the second viewing position, the second height being larger than the first height; and a releasable retaining device provided on the main board module for retaining releasably the second module member at the first supporting position against biasing action of the biasing member.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
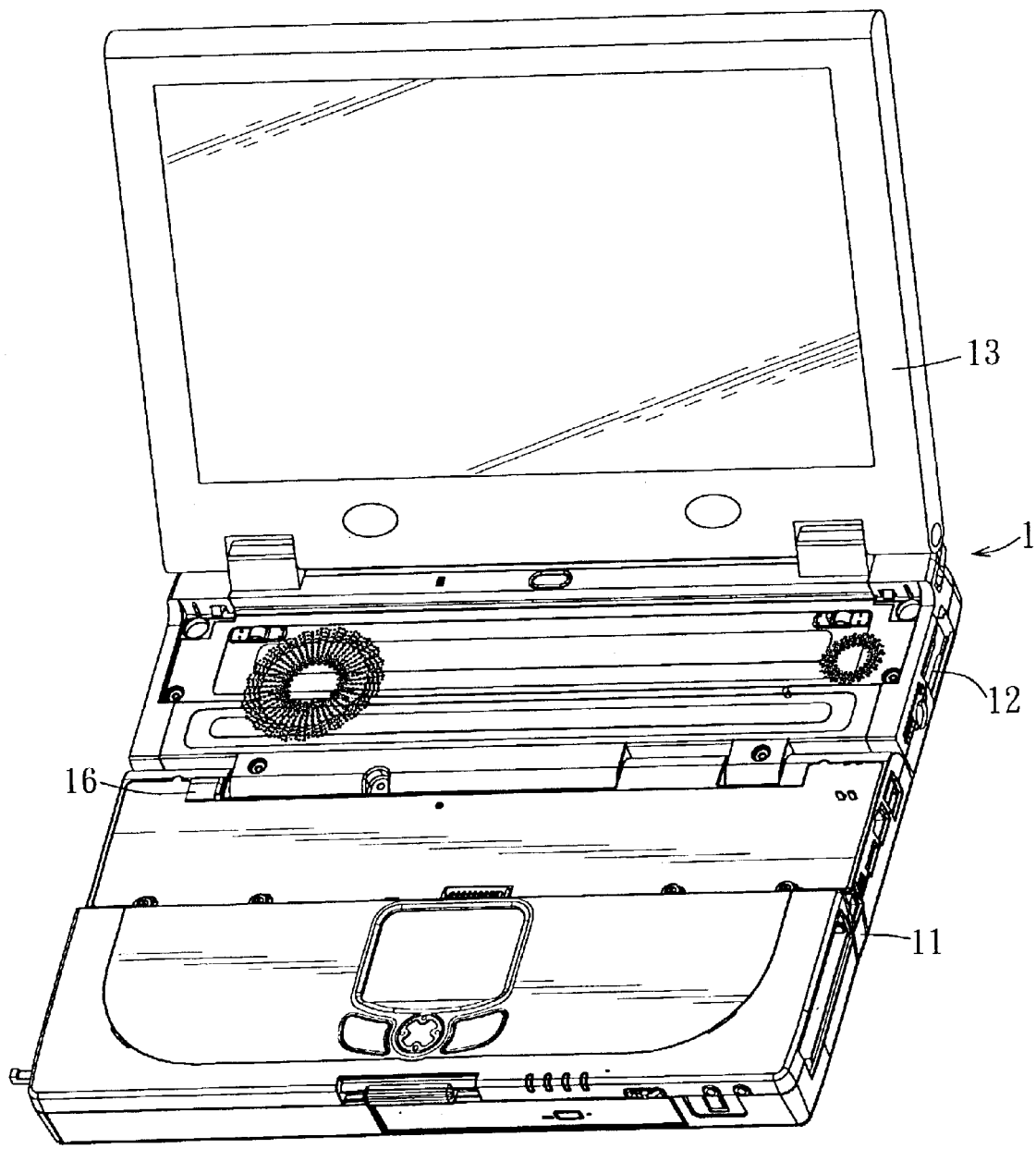
FIG. 1 is a perspective view of the preferred embodiment of an electronic apparatus according to the present invention.
Figure 2:
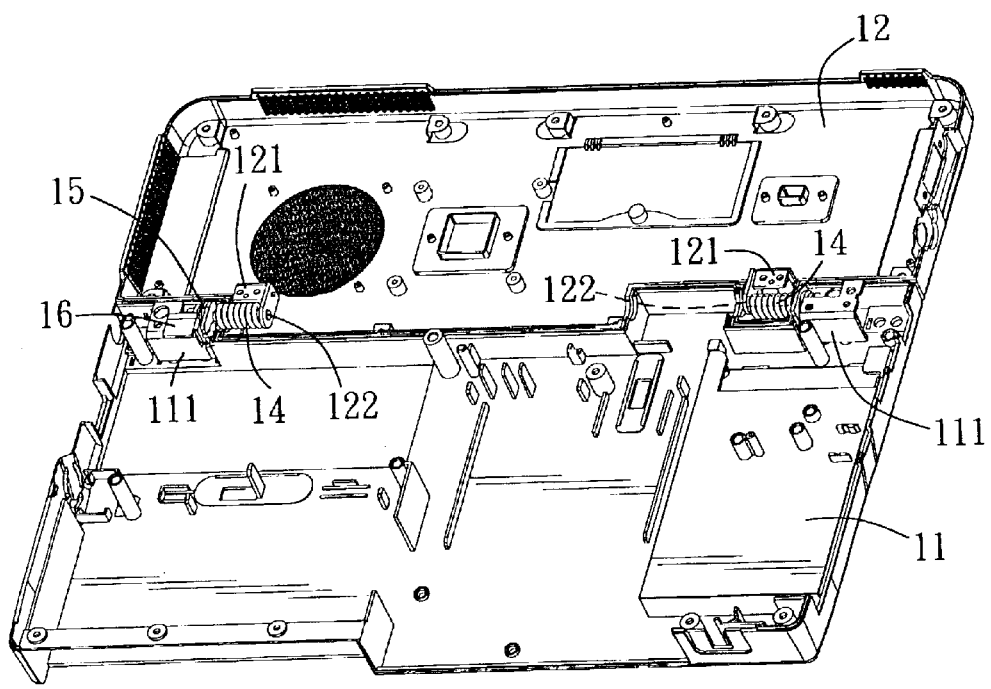
FIG. 2 is a fragmentary perspective view of the preferred embodiment, illustrating the internal configuration of a main board module thereof.

Referring to FIGS. 1 and 2, the preferred embodiment of an electronic apparatus 1 according to the present invention is shown to include first and second module members 11, 12 that constitute a main board module, a display module 13, a pair of biasing members 14, and first and second stop members 15, 16 that constitute a releasable retaining device.

The electronic apparatus 1 of this embodiment is a notebook computer. In practice, the present invention can be applied to any electronic apparatus with a display module, and should not be limited to a notebook computer.

The second module member 12 is connected to the first module member 11 such that the second module member 12 is pivotable relative to the first module member 11 about a first pivot axis. Each of the first and second module members 11, 12 has front and rear sides.

Figure 3:
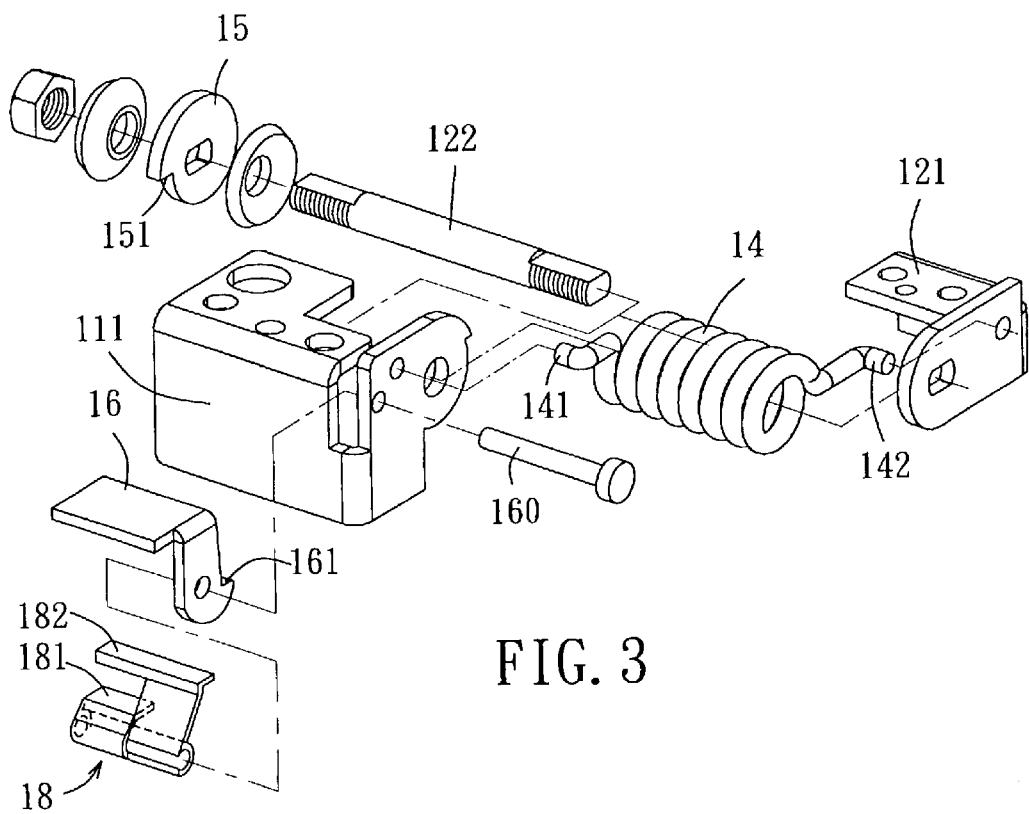
FIG. 3 is a fragmentary exploded perspective view of the preferred embodiment, illustrating a biasing member, a first stop member, a second stop member, a pivot axle, and connecting portions of the main board module.
Figure 4:
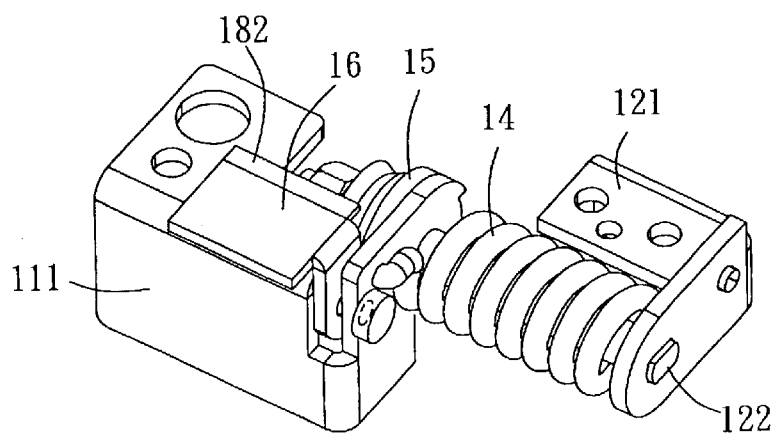
FIG. 4 is an assembled perspective view of FIG. 3.

Referring to FIGS. 2, 3 and 4, the first module member 11 has a pair of first connecting portions 111, whereas the second module member 12 has a pair of second connecting portions 121. Each of a pair of pivot axles 122 extends along the first pivot axis and is connected rotatably to a respective one of the first connecting portions 111 and non-rotatably to a respective one of the second connecting portions 121.

Figure 7:
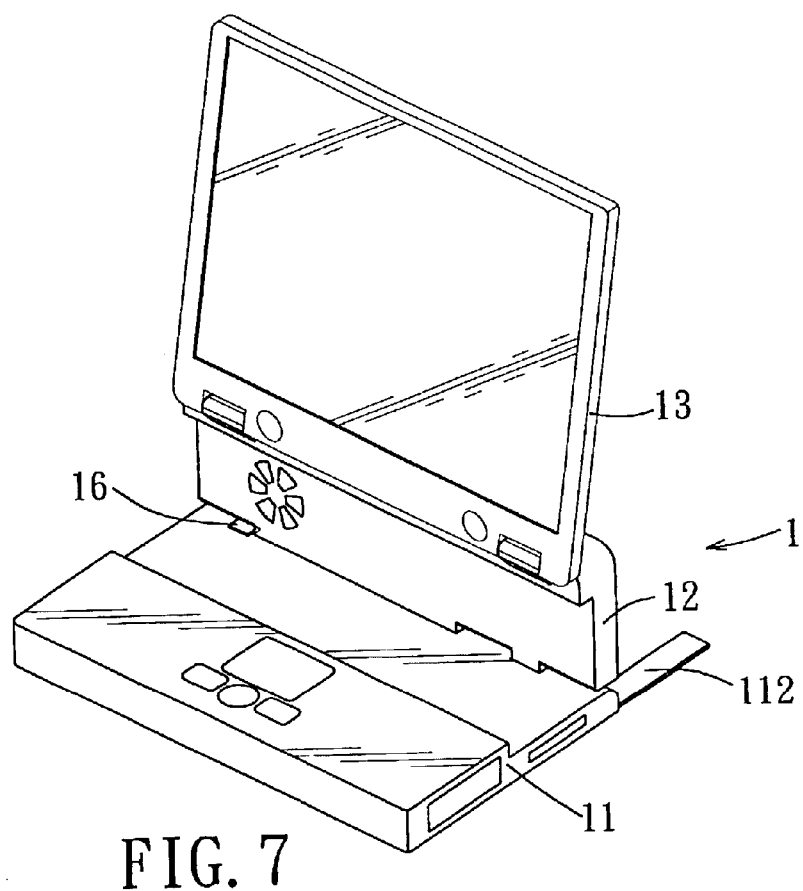
FIG. 7 is a perspective view to illustrate the preferred embodiment when the second module member is at the second supporting position.

The display module 13 has a viewing side, and is connected to the second module member 12 such that the display module 13 is pivotable relative to the second module member 12 about a second pivot axis parallel to the first pivot axis between a first viewing position, where the viewing side of the display module 13 forms an angle with the front side of the second module member 12, as shown in FIG. 1, and a second viewing position, where the viewing side of the display module 13 is generally parallel to the front side of the second module member 12, as shown in FIG. 7.

Each of the biasing members 14 has opposite ends 141, 142 connected respectively to the first and second module members 11, 12. The biasing members 14 bias the second module member 12 to pivot about the first pivot axis from a first supporting position shown in FIG. 1, where the rear sides of the first and second module members 11, 12 are generally coplanar so as to be adapted to support the main board module on a table surface and where the display module 13 is at a first height relative to the table surface when the display module 13 is at the first viewing position, to a second supporting position shown in FIG. 7, where the front side of the second module member 12 forms an angle with the front side of the first module member 11 and where the display module 13 is at a second height relative to the table surface when the display module 13 is at the second viewing position, the second height being larger than the first height.

Preferably, a keyboard device (not shown) for data input purposes is mounted detachably on the main board module when the second module member 12 is at the first supporting position. Since the feature of the present invention does not reside in the detachable configuration of the keyboard device, a description of the same is omitted herein for the sake of brevity.

In this embodiment, each of the biasing members 14 includes a coil spring sleeved on a respective one of the pivot axles 122. The opposite ends 141, 142 of each of the biasing members 14 are connected to the first and second connecting portions 111, 121, respectively.

The first stop member 15 is mounted on and is co-rotatable with one of the pivot axles 122. The first stop member 15 is formed with a first stop edge 151.

Figure 5:
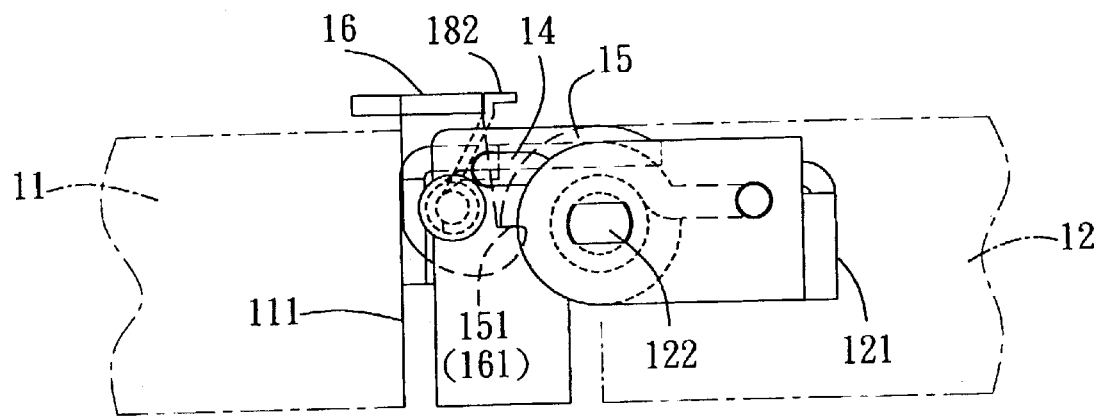
FIG. 5 is a schematic side view of the preferred embodiment, illustrating a state where a second module member of the main board module is at a first supporting position.
Figure 6:
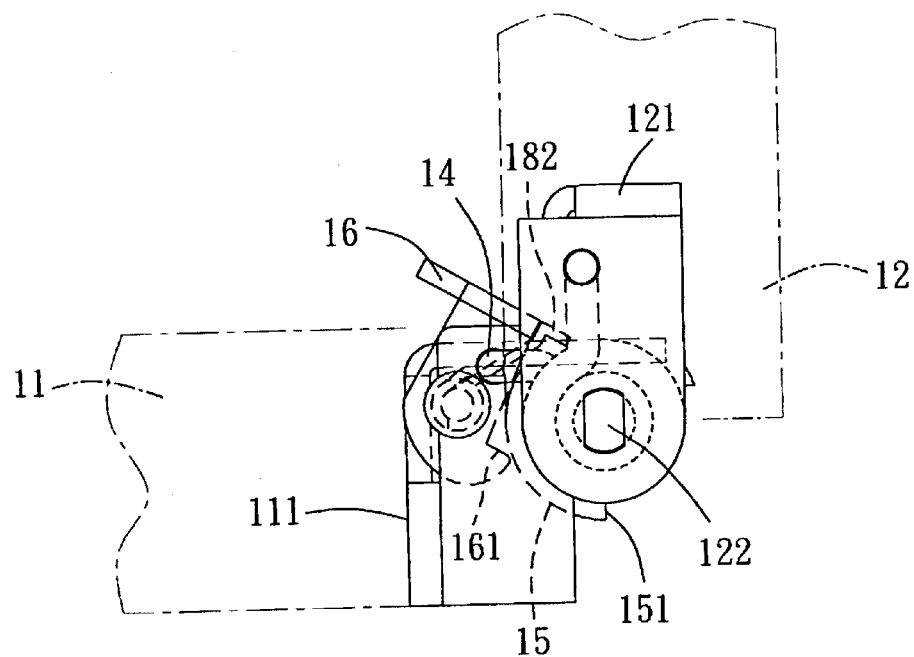
FIG. 6 is a schematic side view of the preferred embodiment, illustrating a state where the second module member is at a second supporting position.

The second stop member 16 is mounted pivotally on one of the first connecting portions 111 through a pin 160. The second stop member 16 is formed with a second stop edge 161. The second stop member 16 is pivotable from a retaining position shown in FIG. 5, where the second stop edge 161 abuts against the first stop edge 151 to resist rotation of the pivot axle 122 and thereby retain releasably the second module member 12 at the first supporting position against the biasing action of the biasing member 14, to a releasing position shown in FIG. 6, where the second stop edge 161 ceases to abut against the first stop edge 151 to permit rotation of the pivot axle 122 so that the second module member 12 moves to the second'supporting position due to the biasing action of the biasing member 14.

The releasable retaining device further includes a biasing unit 18 mounted on the pin 160 and having a first end 181 abutting against the first connecting portion 111 and a second end 182 abutting against the second stop member 16.

The biasing unit 18, which is formed as a torsion spring plate, biases the second stop member 16 to the retaining position.

Figure 8:
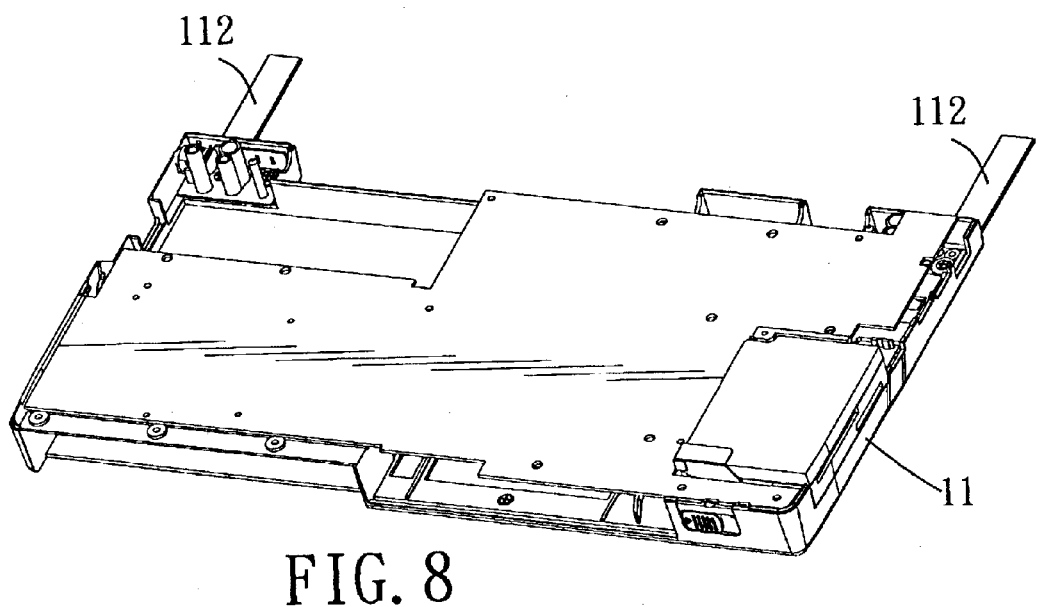
FIG. 8 is a fragmentary perspective view of the preferred embodiment, illustrating how a support leg unit cooperates with the first module member to support the electronic apparatus.

Referring to FIGS. 7 and 8, the first module member 11 is provided with a support leg unit including a pair of support legs 112 that are disposed underneath the second module member 12 when the second module member 12 is at the first supporting position and that cooperate with the rear side of the first module member 11 to support the electronic apparatus 1 on the table surface when the second module member 12 is at the second supporting position.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An electronic apparatus comprising:

a main board module including a first module member, and a second module member connected to said first module member such that said second module member is pivotable relative to said first module member about a first pivot axis, each of said first and second module members having front and rear sides;

a display module having a viewing side, and connected to said second module member such that said display module is pivotable relative to said second module member about a second pivot axis parallel to the first pivot axis between a first viewing position, where said viewing side of said display module forms an angle with said front side of said second module member, and a second viewing position, where said viewing side of said display module is generally parallel to said front side of said second module member;

a biasing member having opposite ends connected respectively to said first and second module members, said biasing member biasing said second module member to pivot about the first pivot axis from a first supporting position, where said rear sides of said first and second module members are generally coplanar so as to be adapted to support said main board module on a table surface and where said display module is at a first height relative to the table surface when said display module is at the first viewing position, to a second supporting position, where said front side of said second module member forms an angle with said front side of said first module member and where said display module is at a second height relative to the table surface when said display module is at the second viewing position, the second height being larger than the first height; and a releasable retaining device provided on said main board module for retaining releasably said second module member at the first supporting position against biasing action of said biasing member.

2. The electronic apparatus as claimed in claim 1, wherein said releasable retaining device includes:

a first stop member mounted on said second module member and formed with a first stop edge; and a second stop member mounted movably on said first module member and formed with a second stop edge, said second stop member being movable from a retaining position, where said second stop edge abuts against said first stop edge to retain said second module member at the first supporting position against the biasing action of said biasing member, and a releasing position, where said second stop edge ceases to abut against said first stop edge to permit movement of said second module member to the second supporting position due to the biasing action of said biasing member.

3. The electronic apparatus as claimed in claim 1, wherein said first module member has a first connecting portion, and said second module member has a second connecting portion, said main board module further including a pivot axle that extends along the first pivot axis and that is connected rotatably to said first connecting portion and non-rotatably to said second connecting portion.

4. The electronic apparatus as claimed in claim 1, wherein said first module member is provided with a support leg unit that is disposed underneath said second module member when said second module member is at the first supporting position and that cooperates with said rear side of said first module member to support said electronic apparatus on the table surface when said second module member is at the second supporting position.

5. The electronic apparatus as claimed in claim 2, wherein said releasable retaining device further includes a biasing unit for biasing said second stop member to the retaining position.

6. The electronic apparatus as claimed in claim 3, wherein said biasing member includes a coil spring sleeved on said pivot axle, said opposite ends of said biasing member being connected to said first and second connecting portions, respectively.

7. The electronic apparatus as claimed in claim 3, wherein said releasable retaining device includes:

a first stop member mounted on and co-rotatable with said pivot axle, said first stop member being formed with a first stop edge; and a second stop member mounted pivotally on said first connecting portion and formed with a second stop edge, said second stop member being pivotable from a retaining position, where said second stop edge abuts against said first stop edge to resist rotation of said pivot axle and thereby retain said second module member at the first supporting position against the biasing action of said biasing member, to a releasing position, where said second stop edge ceases to abut against said first stop edge to permit rotation of said pivot axle so that said second module member moves to the second supporting position due to the biasing action of said biasing member.

8. The electronic apparatus as claimed in claim 3, wherein said biasing unit is formed as a torsion spring plate.

9. The electronic apparatus as claimed in claim 7, wherein said releasable retaining device further includes a biasing unit mounted on said first connecting portion for biasing said second stop member to the retaining position.

10. The electronic apparatus as claimed in claim 9, wherein said biasing unit is formed as a torsion spring plate.

\* \* \* \* \*